United States Patent [19]

Murakami et al.

[11] Patent Number: 5,001,629
[45] Date of Patent: Mar. 19, 1991

[54] CENTRAL PROCESSING UNIT WITH IMPROVED STACK REGISTER OPERATION

[75] Inventors: Joji Murakami; Kenji Yamada, both of Kawasaki; Hideki Isobe, Tokyo; Toshiyuki Igarashi, Yokohama; Yoshihiro Kubo, Kawasaki, all of Japan

[73] Assignee: Fujitsu Limited, Kawasaki, Japan

[21] Appl. No.: 110,725

[22] PCT Filed: Jan. 27, 1987

[86] PCT No.: PCT/JP87/00052

§ 371 Date: Sep. 25, 1987

§ 102(e) Date: Sep. 25, 1987

[87] PCT Pub. No.: WO87/04541

PCT Pub. Date: Jul. 30, 1987

[30] Foreign Application Priority Data

Jan. 27, 1986 [JP] Japan ............................. 61-015205

[51] Int. Cl.[5] .......................... G06F 9/28; G06F 9/30; G06F 12/00; G06F 13/00
[52] U.S. Cl. .................................. 364/200; 364/239; 364/240; 364/244.3; 364/245.7; 364/247; 364/254.5; 364/259; 364/260.2; 364/927.8; 364/935.4; 364/940

[58] Field of Search ..................... 364/200, 900

[56] References Cited

U.S. PATENT DOCUMENTS

| 4,323,964 | 4/1982 | Gruner | 364/200 |
| 4,323,981 | 4/1982 | Nakamura | 364/749 |
| 4,472,773 | 9/1984 | Stanley | 364/200 |
| 4,521,851 | 6/1985 | Trubisky et al. | 364/200 |
| 4,541,045 | 9/1985 | Kromer, III | 364/200 |
| 4,771,376 | 9/1988 | Kamiya | 364/200 |

Primary Examiner—Archie E. Williams, Jr.
Assistant Examiner—Ayni Mohamed
Attorney, Agent, or Firm—Staas & Halsey

[57] ABSTRACT

In a central processing unit, one write address is made to correspond to a pair of registers, and when an instruction output from an instruction decoder is a data transfer instruction to either one of the above-mentioned pair of registers, the data held in one of the above-mentioned pair of registers is kept to be held in either register of the above-mentioned pair of registers and the data from the internal data bus is transferred to the remaining register of the pair of registers, and in response to a read instruction, data is transferred from each register to the internal data bus without changing the contents of the other register.

6 Claims, 6 Drawing Sheets

CENTRAL PROCESSING UNIT WITH IMPROVED STACK REGISTER OPERATION

OPERATION FIELD OF THE INVENTION

The present invention relates to a central processing unit by which an effective operation is carried out without the need for a complex program. The present invention is applicable to a central processing unit of any type of computer, whether it is a general purpose, large scale computer or a microcomputer.

DESCRIPTION OF THE RELATED ART

A central processing unit (hereinafter referred to as a CPU) is provided with an arithmetic unit and a plurality of registers, and executes processes such as adding data transferred from a memory to a register and storing the result in a register. For such processes, the CPU is provided with an arithmetic and logic unit, a plurality of registers, a program counter for reading out each instruction from a main memory, a decoder for decoding the instructions, and so forth.

In the program stored in the main memory, instructions to command a data transfer between a certain register and the main memory or another register, and an operation on data between registers, etc. are included.

To improve the processing function of a CPU, the number of registers must be increased. However, when the number of registers is increased, the number of addresses specifying registers is also increased, and accordingly, the bit length of an instruction is increased, and this requires the use of a large storage area in the main memory.

To overcome this problem, a so-called stack system is provided in which a stored-type logical address is specified instead of increasing the number of registers. Data is added to the stack in the transferred sequence, and finally an operation is carried out with the transferred data and the previous data. However, a data transfer or an operation cannot be effected by the stack system unless the transferred sequence is memorized. Further, when data is read out from the stack by a pop operation, the data disappears from the stack. Therefore, when the data is to be kept in the stack after popping, a complex program becomes necessary. For example, the same data must be written by a new pushing or a new instruction must be made to double the amount of data to be pushed. Therefore, the conventional method utilizing the assembler language cannot be used, and support such as using a high-level language must be reinforced, and thus it is not entirely appropriate for effectively forming a small-scale program.

SUMMARY OF THE INVENTION

An object of the present invention is, in view of the above-mentioned problems in the conventional stack system, and based on the concept of carrying out a push operation on a pair of registers during writing and reading out not by pop operation but directly from each register during reading, to make it possible to increase the number of registers in a central processing unit without increasing the bit length.

Another object of the present invention is to provide a register construction in the above-mentioned central processing unit in which even a small-scale assembler language can be used for programming and thus the performance of the CPU be improved.

To attain the above objects, there is provided, according to the present invention, a central processing unit comprising an internal data bus, an arithmetic and logic unit, connected to the internal data bus, for executing an arithmetic operation and a logical operation; a plurality of registers, connected to the internal data bus, for storing the operated results and necessary data; and an instruction decoder, connected to the internal data bus, for decoding each instruction of the processing program read from a main memory. The plurality of registers and an additional register consist of a pair of registers.

A discriminating unit is provided for discriminating whether or not the decoded instruction output from the instruction decoder is a data transfer instruction from the internal data bus to one register of the pair of registers; and when it is discriminated as the data transfer instruction by the discriminating unit, the data from the internal data bus is transferred to the remaining register of the pair of registers while the data held in the one register is held in the other of the pair of registers.

When it is discriminated as other than the data transfer instruction by the discriminating unit, data is transferred from each register to the internal data bus, in accordance with the read instruction to each of the pair of registers, and without changing the contents of the other register.

DESCRIPTION OF THE PREFERRED EMBODIMENT

Figure 1:
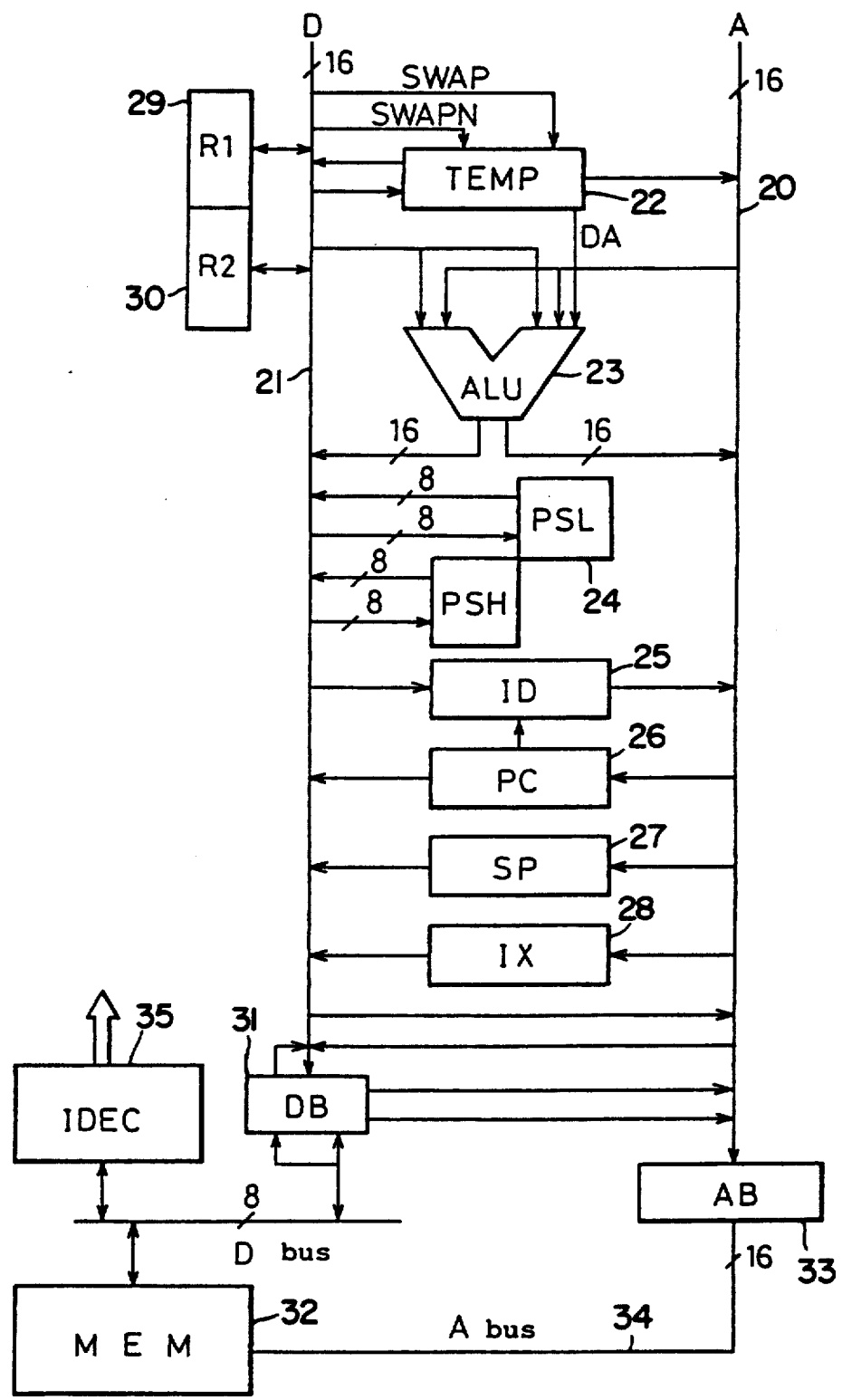
FIG. 1 is a block diagram illustrating a construction of a CPU which is applicable to the present invention.

In FIG. 1, an architecture of a 16-bit bus is illustrated as an example of a CPU applicable to the present invention. The CPU applied to the present invention has connected, between an internal address bus (A) 20 and an internal data bus (D) 21, a temporary register (TEMP) 22, an arithmetic and logic unit (ALU) 23, a lower-bit register (PSL) 24 for a program status word, an incrementer & decrementer (ID) 25, a program counter (PC) 26, a stack pointer (SP) 27, an index register (IX) 23, and so forth. Other registers (R1) 29 and (R2) 30 are also connected to the data bus 21. The internal data bus D is connected, through a data buffer memory (DB) 31, to a main memory (MEM) 32, and the internal address bus (A) 20 is connected through an address buffer memory (AB) 33 to an address bus 34.

The instruction decoder (IDEC) 35 decodes each instruction read from the main memory MEM and accesses the necessary unit.

For example, when an addition is to be effected, the numbers to be added are read from the main memory MEM and are set in the registers, for example, R1 and R2. By an adding instruction, the ALU adds the data in the registers R1 and R2 and sets the result in the R1. This operation is controlled by a processing program stored in the main memory MEM. The program counter PC is used to read each instruction from the main memory MEM to the instruction decoder (IDEC) 35, and during execution of the instruction, it specifies an address of the main memory MEM at which the next instruction is located.

The present invention intends to realize a write operation to, for example, the two registers R1 and R2, by substantially a single address.

Figure 2:
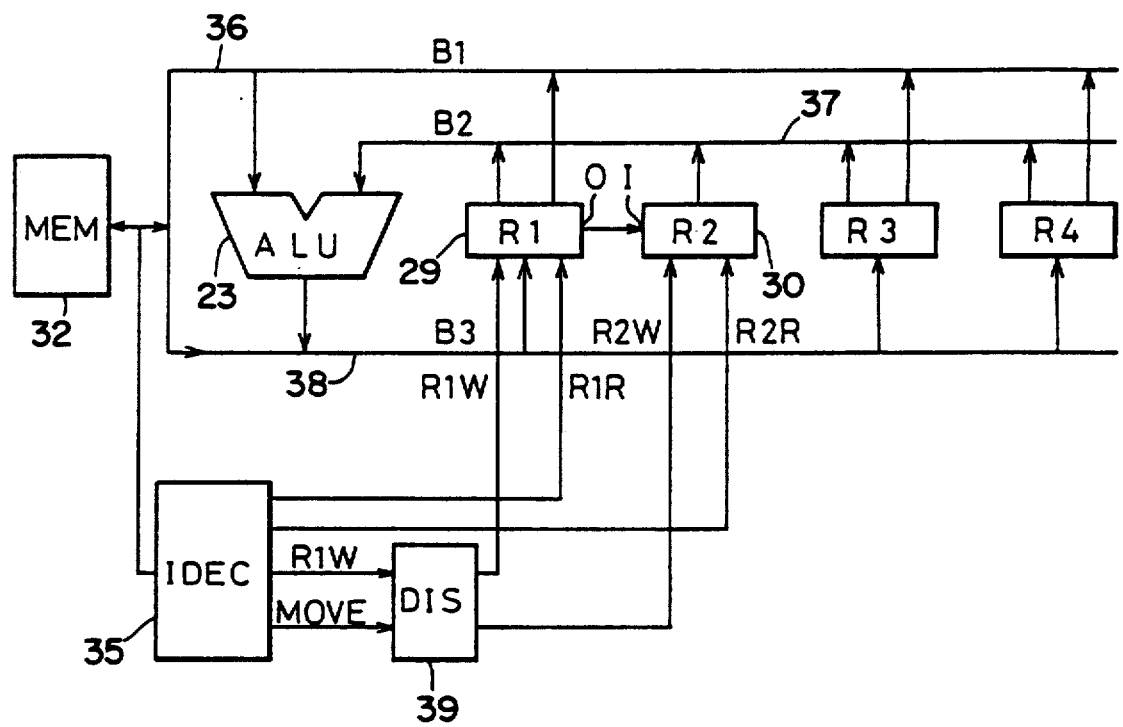
FIG. 2 is a block diagram showing an embodiment of the present invention.

FIG. 2 is a block diagram illustrating a central processing unit according to an embodiment of the present invention. In FIG. 2, the same parts in FIG. 1 are provided with the same reference symbols. In FIG. 2, B1, B2, and B3 are internal data buses 36–38, DIS is a discriminating unit 39 for the output of the instruction decoder IDEC, and R3 and R4 are other registers. To simplify the drawing, the address bus A, the data buffer memory DB, the address buffer memory AB, and so forth are omitted.

In the embodiment, the registers R1 and R2 are constituted as a pair of registers. The register R1 is a master register and the register R2 is a slave register. The output port O of the master register R1 is electrically connected to the input port I of the slave register R2.

The instruction decoder IDEC is used for decoding each instruction of the processing program read from the main memory MEM, and the decoded result is, for example, a write instruction R1W to the register R1 or a read instruction from the register R2. Also, in addition to the write instruction or read instruction, the data transfer instruction MOVE between registers or between the main memory and the register, or a calculation instruction such as addition or subtraction, are output from the instruction decoder.

When the output of the instruction decoder IDEC is a write instruction R1W to the master register R1 and the data transfer instruction MOVE, the discriminating unit DIS generates the write instruction R1W to the register R1 and the write instruction R2W to the register R2. As a result, data is written to the master register R1 from the main memory MEM or the other registers R2 and R3 through the data bus B3; and the data which is stored in the master register R1 is automatically transferred to the slave register R2 through the output port O and the input port I. When the data is transferred from the master register R1 to the slave register R2, data which has been stored in the slave register R2 is sequentially pushed and superseded.

When the instruction decoder IDEC is not outputting the data transfer instruction MOVE but is outputting a calculation instruction, the discriminating unit DIS does not generate the write instruction R2W to the slave register R2, and when a calculation is effected on the data in the master register R1 and the slave register R2, read instructions R1R and R2R are given from the instruction decoder IDEC to the master register R1 and the slave register R2, respectively. The read data is transferred through an internal bus B2 to the arithmetic and logic unit ALU. When the result calculated by the ALU is to be written into the master register R1, the discriminating unit DIS generates the write instruction R1W only and does not generate the write instruction R2W to the slave register R2. As a result, the calculated result is written into the master register R1, but the data which has been in the master register is not transferred to the slave register. Accordingly, in this case, the contents of the slave register R2 are not changed. Also, even when data is transferred from the register R1 to the memory MEM and so forth, different from the case of a stack memory, the data is not returned from the slave register R2 to the master register R1, that is, the data transfer between R1 and R2 is unidirectional.

Figure 3:
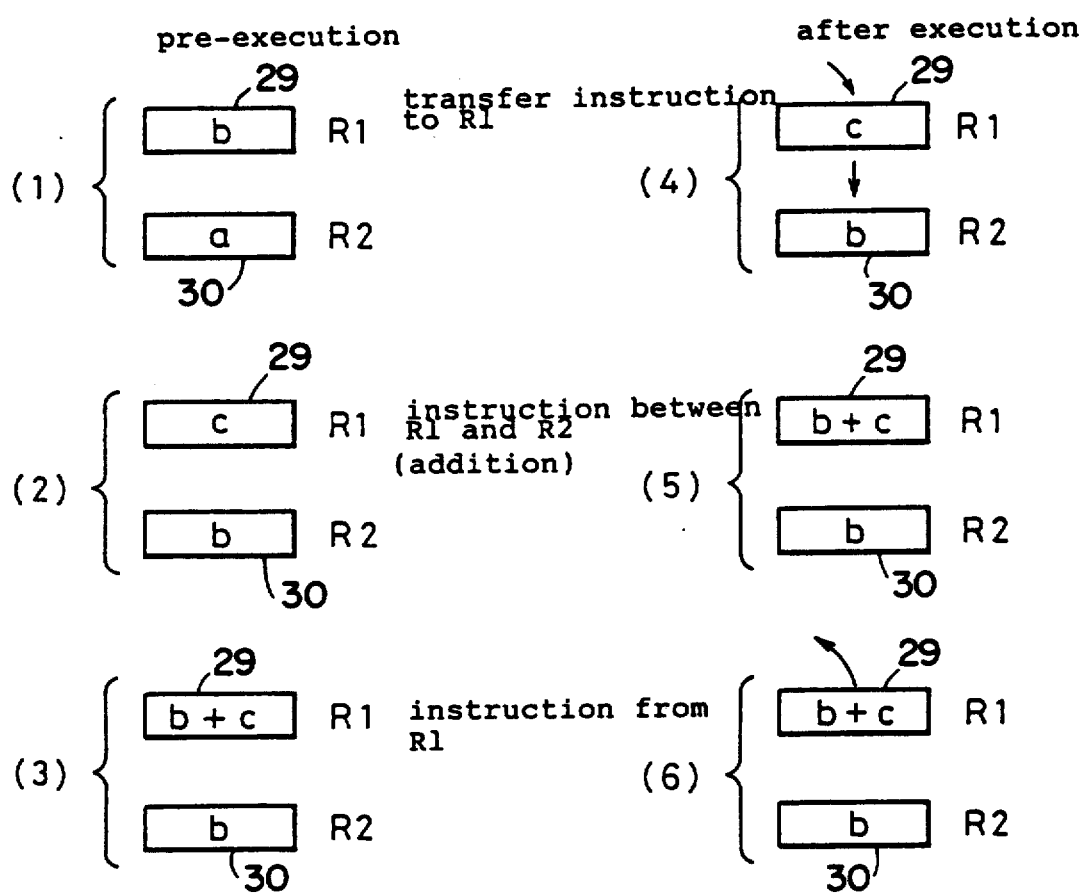
FIG. 3 is a diagram explaining the operation of the device shown in FIG. 2.

By providing such an additional register R2, the calculation between two data can be effectively carried out. This is explained with reference to FIG. 3, wherein as shown in (1), in a state when data b is set in the master register R1 and data a is set in the slave register R2, if a transfer instruction MOVE for data c from, for example, the memory MEM to the register R1, is provided, and if executed, the data c is entered into the register R1 and the data b is entered into the register R2 so that the data a in the register R2 is superseded. This state is shown in (2). Next, if an addition instruction for the data in the register R1 and R2 is provided, the data c and b are sent through the buses B1 and B2 to the ALU and are added. The result (b+c) is stored in the register R1. The contents of the register R2 are not changed at this time. This state is shown in (5). Next, in the state (3) (which is the same as (5)), if a data transfer instruction is sent from the register R1 to, for example, the memory MEM, the data (b+c) in the register R1 are sent through the bus B1 to the memory MEM. The data in the register R2 is not changed.

As described above, when a calculation involving two items of data b and c is to be effected, it is sufficient to transfer the items of data b and c to only the master register R1 and then to provide a calculation instruction on the data in the registers R1 and R2. It is not necessary to transfer the data to the two registers R1 and R2 (for this instruction, addresses designating the registers R1 and R2 are necessary) and to provide the addition instruction on the data in the registers R1 and R2, so that an efficient processing becomes possible.

Not only the register R1 but also the registers R3 and R4 may have an additional register. Since it is not necessary for the additional register to be addressed during writing, the number of address bits is not increased and the bit length of an instruction is not increased even when the additional register is added.

Figure 4:
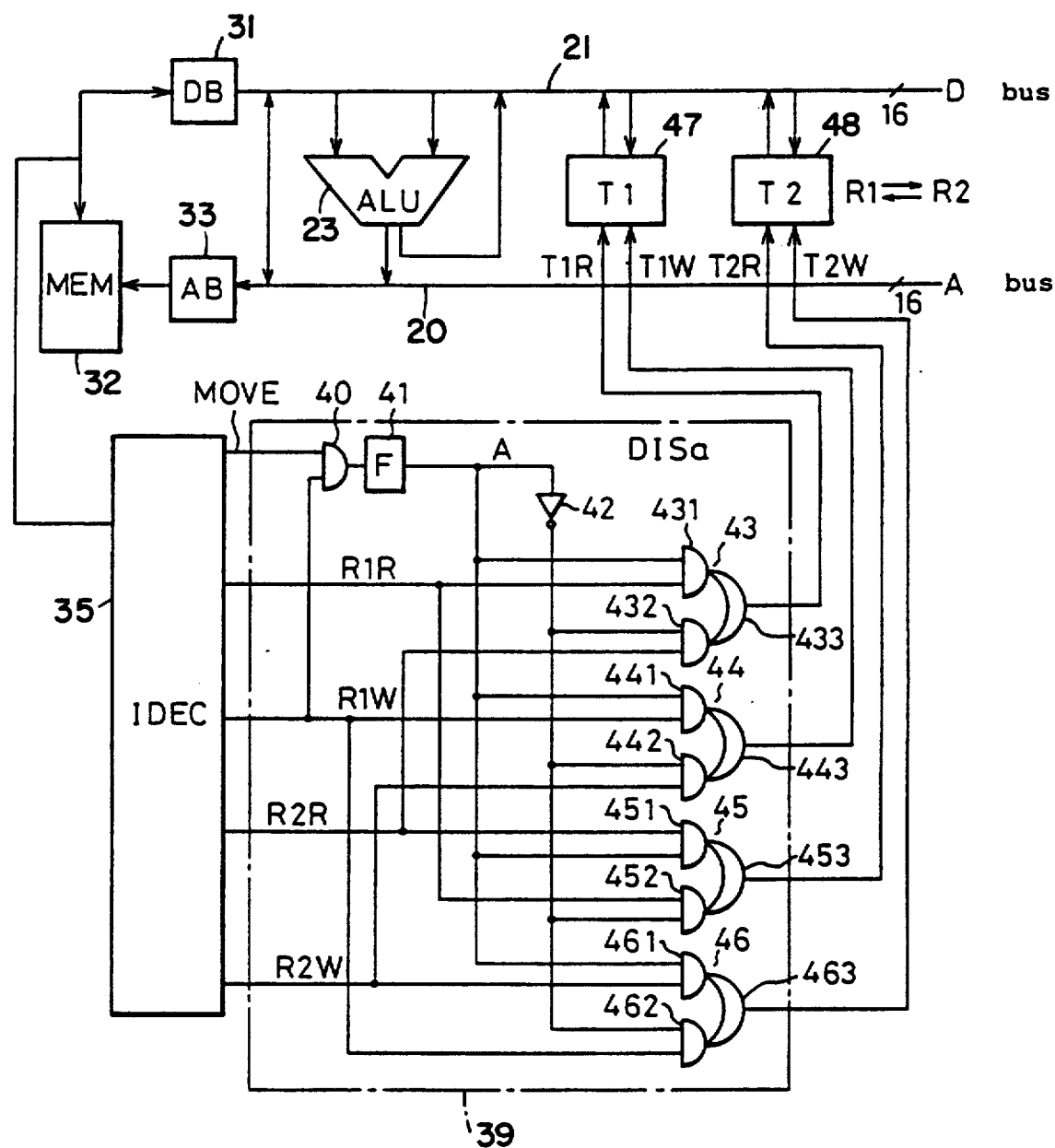
FIG. 4 is a block diagram showing another embodiment of the present invention.

FIG. 4 is a block diagram showing a central processing unit according to another embodiment of the present invention. In FIG. 4, to simplify the drawing, the internal bus is illustrated by a single line, and only two registers T1 47 and T2 48 are illustrated; that is, the others are omitted. In this embodiment, by changing the write address and the read address of the two registers T1 and T2, an operation substantially equivalent to the data transfer between the registers T1 and T2 is carried out. To this end, the discriminating unit DISa consists of an AND gate 40 which receives a data transfer instruction and a write instruction R1W from an instruction decoder IDEC, a flip-flop 41 having an output which is inverted when the output of the AND gate 40 turns to a high level, an inverter 42 for obtaining an inverted signal $\overline{A}$ of the output A, and four logic circuits 43, 44, 45, and 46 each consisting of two AND gates and one OR gate. The logic circuit 43 consists of AND gates 431 and 432 and an OR gate 433 for receiving the outputs thereof. The AND gate 431 receives a signal A and a read instruction R1R. The AND gate 432 receives a signal $\overline{A}$ and a read instruction R2R. The AND gate 441 receives the signal A and a write instruction R1W. The AND gate 442 receives the signal $\overline{A}$ and a write signal R2W. The AND gate 451 receives the signal A and the read signal R2R. The AND gate 452 receives the signal $\overline{A}$ and the read signal R1R. The AND gate 461 receives the signal A and the write signal R2W. The AND gate 462 receives the signal $\overline{A}$ and the write signal R1W.

The output of the OR gate 433 becomes a read instruction T1R to the register T1. The output of the OR gate 443 becomes a write instruction to the register T1. The output of the OR gate 453 becomes a read instruction to the register T2. The output of the OR gate 463 becomes a write instruction to the register T2.

Figure 5:
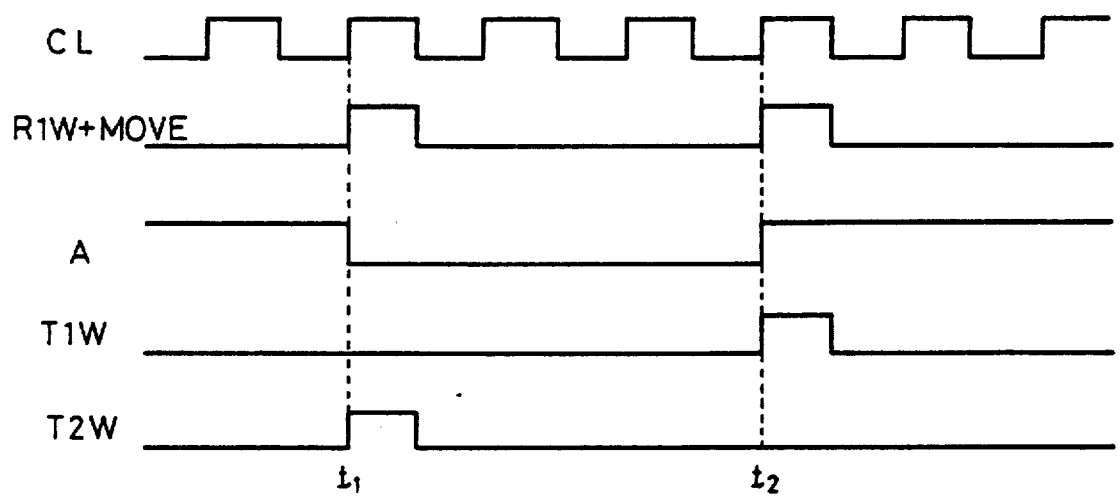
FIG. 5 is a waveform diagram explaining the operation of the device shown in FIG. 4.

FIG. 5 is a waveform diagram explaining the operation of the unit in FIG. 4. In FIG. 5, CL is an internal clock signal of the central processing unit. In a state when the output signal A of the flip-flop 41 is at a high level, it is assumed that, at a time $t_1$, a data transfer instruction MOVE and a write instruction R1W are output from the instruction decoder IDEC. These instructions are instructions for transferring data from the main memory MEM or other registers (not shown in FIG. 4) to either one of the registers T1 and T2. When the AND gate 40 receives these instructions, it turns the output signal A of the flip-flop 41 to the low level. As a result, the output signal of the inverter 42 turns to the high level so that the write signal R1W passes through the AND gate 462 and the OR gate 463 and is applied as T2W to the register T2. In this state, when a read instruction R1R is output from the instruction decoder IDEC, the R1R is applied as T2R through the AND gate 452 and the OR gate 453 to the register T2. When a read instruction R2R is output, the R2R is applied as T1R through the AND gate 432 and the OR gate 433 to the register T1. Also, the write instruction R2W is applied as T1W through the AND gate 442 and the OR gate 443 to the register T1. That is, after a time $t_1$ and until the next R1W and MOVE are given, the register R1 viewed from the instruction decoder IDEC is equivalent to the register T2, and the register R2 is equivalent to the register T1.

After the time $t_2$, when the data transfer instruction MOVE and the write instruction R1W are output again, the output signal A of the flip-flop 41 is turned to the high level, and the resultant R1W and R1R are respectively applied as the T1W and the T1R to the register T1, and the R2W and the R2R are respectively applied as the T2W and the T2R to the register T2. That is, after a time $t_2$ and until the next R1W and MOVE are given, the register R1 viewed from the instruction decoder IDEC is equivalent to the register T1. This means that it is equivalent that, by the write instruction R1W and the data transfer instruction MOVE given at the time $t_2$, the register corresponding to the register R1 is changed from T2 to T1, and the contents of the register R1 are transferred to the register R2.

Figure 6:
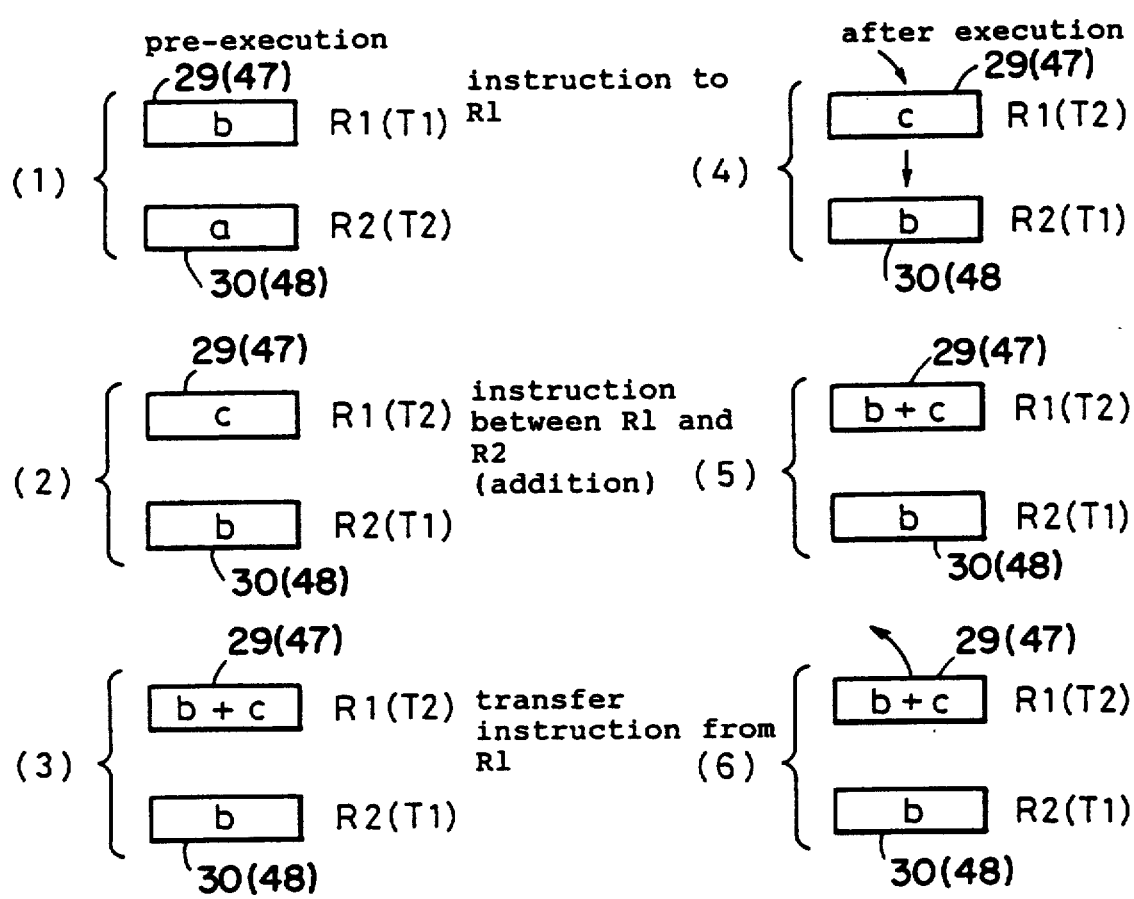
FIG. 6 is a diagram explaining the operation of the device shown in FIG. 4.

The embodiment of FIG. 4 is further described with reference to FIG. 6. In the state (1), the register R1 is assumed to correspond to the register T1, and the register R2 is assumed to correspond to the register T2. Therefore, data b is set in the register T1, and data a is set in the register T2. From this state, when the instructions of R1W and MOVE are given, the register R1 turns to correspond to the register T2 and the register R2 turns to correspond to the register T1. Therefore, as shown in state (4), the data b of the register T1 corresponding to the register R2 is set in the register R2. That is, this is equivalent to the case when the data b is transferred from the register R1 to the register R2, and by the write instruction R1W, the data a which has been in the register T2 corresponding to the register R1 is updated by a new data c by the write instruction R1W. This state is shown in (2). Next, when an add instruction is given on the data in the registers R1 and R2, the data c is sent from the register T2 and the data b is sent from the register T1 to the ALU, and the added result (b+c) is stored in the register T2. The contents of the register T1 are not changed. This state is shown in states (5) and (3). Next, in the state (3), when a data transfer instruction is sent from the register R1 to, for example, the MEM, as shown in (6), the data (b+c) in the register T2 is sent to the memory MEM. The data b in the register T1 is not changed.

Therefore, in this embodiment also, when a calculation of data stored in the two registers T1 and T2 is to be carried out, a write operation to the two registers can be executed by applying only the write instruction R1W to the single register R1.

The registers constituting a pair are not of course limited to T1 and T2.

As described above, according to the present invention, in a central processing unit, by making a single write address correspond to a pair of registers, such advantages are obtained that calculations can be effectively executed and the programming may use small-scale assembler language.

What is claimed is:

1. A central processing unit for executing an instruction in a processing program stored in a main memory, comprising:
    an internal data bus operatively connected to the main memory;
    an arithmetic and logic unit, operatively connected to said internal data bus, for executing an arithmetic operation and a logical operation;
    a plurality of registers, including a pair of registers having a single address, operatively connected to said internal data bus,
    an instruction decoder, operatively connected to said internal data bus, for decoding each instruction of the processing program read from the main memory including data transfer and read instructions; and
    discriminating means for discriminating whether the decoded instruction output from said instruction decoder is a data transfer instruction from said internal data bus to said pair of registers, said pair of registers responding to discrimination of a first data transfer instruction from said internal data bus to said pair of registers by receiving the new data from said internal data bus in a first register of said pair of registers while old data is held in a second register of said pair of registers and until a next data transfer instruction is discriminated, the new data in the first register is read in response to a read instruction for the first register of said pair of registers, and when said discriminating means discriminates the next data transfer, the new data is held in the first register and newer data from said internal data bus is written in the second register of said pair of registers, and until a further data transfer instruction is discriminated, the newer data is read from the second register in response to another read instruction for the first register of said pair of registers, and said pair of registers responding to a read instruction from said pair of registers to said internal data bus by transferring data from each register in said pair of registers to said internal data bus without changing the contents of said pair of registers.

2. A central processing unit as claimed in claim 1, wherein said pair of registers consist of a master register and a slave register, said slave register having an input port, said master register having an output port operatively connected to the input port of said slave register, and wherein when said discriminating means discriminates the data transfer instruction, data is transferred from said internal data bus to said master register and the old data in said master register is transferred through the output port and the input port to said slave register.

3. A central processing unit as claimed in claim 1, wherein each of said pair of registers have a read address and a write address, and wherein said discriminating means comprises means for changing, each time the data transfer instruction is received, the write address and the read address of one of the registers in said pair of registers to the other register in said pair of registers.

4. A central processing unit as claimed in claim 1, wherein said first and second registers in said pair of registers alternate, between holding data previously stored therein and receiving new data, in response to each discrimination of the data transfer instruction by said discriminating means, and wherein the new data, most recently received by one of said pair of registers, is output in response to a read instruction for the first register of said pair of registers regardless of whether the new data was received by said first register or said second register in response to the data transfer instruction most recently discriminated.

5. A central processing unit for executing an instruction in a processing program stored in a main memory, comprising:

an internal data bus operatively connected to the main memory;

an arithmetic and logic unit, operatively connected to said internal data bus, for executing arithmetic and logical operations;

registers, operatively connected to said internal data bus, including first and second virtual registers having a changeable correspondence to first and second physical registers;

an instruction decoder, operatively connected to said internal data bus, for decoding each instruction of the processing program from the main memory; and discriminating means for discriminating whether the decoded instruction output from said instruction decoder is a data transfer instruction from said internal data bus to one of said virtual registers, said virtual registers responding to discrimination of the data transfer instruction by holding old data of the first virtual register in the first physical register and storing new data from said internal data bus in the second physical register, so that when a first data transfer instruction is discriminated, the new data in the second physical register is read in response to a read instruction for the first virtual register until a next data transfer instruction is discriminated, and when said discriminating means discriminates the next data transfer instruction, the new data is held in the second physical register and newer data from said internal data bus is written in the first physical register and until a further data transfer instruction is discriminated, the newer data is read from the first physical register in response to another read instruction for the first virtual register.

6. A central processing unit as claimed in claim 5, wherein when said discriminating means discriminates a first data transfer instruction, the first physical register contains first data and the second physical register contains second data correspondingly to the old data, third data corresponding to the new data is stored in said first physical register and until a second data transfer instruction is discriminated, said first physical register is addressed as corresponding to said first virtual register and said second physical register is addressed as corresponding to said second virtual register, and wherein when the second data transfer instruction is discriminated, fourth data is stored in said second physical register and until a third data transfer instruction is discriminated, said second physical register is addressed as corresponding to said first virtual register and said first physical register is addressed as corresponding to said second virtual register.

* * * * *

UNITED STATES PATENT AND TRADEMARK OFFICE
CERTIFICATE OF CORRECTION

PATENT NO. : 5,001,629

DATED : March 19, 1991

INVENTOR(S) : Murakami et al.

It is certified that error appears in the above-identified patent and that said Letters Patent is hereby corrected as shown below:

Col. 2, line 56, "23" should be --27--.

Col. 6, line 58, "transfer," should be --transfer instruction,--.

Signed and Sealed this

Twenty-seventh Day of October, 1992

Attest:

DOUGLAS B. COMER

Attesting Officer

Acting Commissioner of Patents and Trademarks